W. M. GREEN.
FORE WHEEL DRIVE FOR MOTOR VEHICLES.
APPLICATION FILED JULY 20, 1915.
1,215,143.  Patented Feb. 6, 1917.
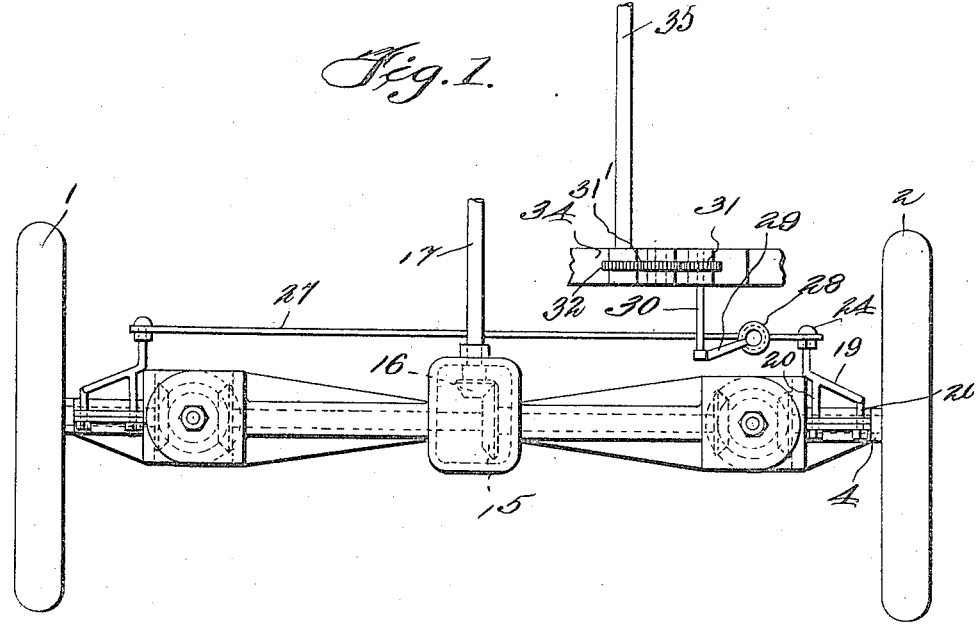
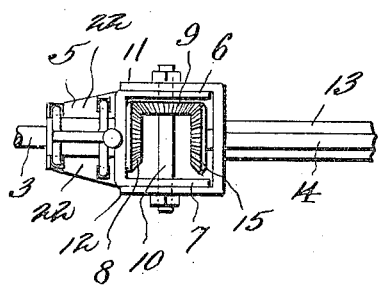
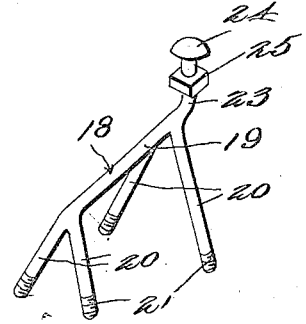
Inventor
W. M. Green,

UNITED STATES PATENT OFFICE.

WILLIAM M. GREEN, OF NEW HAVEN, WYOMING.

FORE-WHEEL DRIVE FOR MOTOR-VEHICLES.

1,215,143.

Specification of Letters Patent.

Patented Feb. 6, 1917.

Application filed July 20, 1915. Serial No. 40,966.

*To all whom it may concern:*

Be it known that I, WILLIAM M. GREEN, a citizen of the United States, residing at New Haven, in the county of Crook and State of Wyoming, have invented certain new and useful Improvements in Fore-Wheel Drives for Motor-Vehicles; and I do hereby declare the following to be a full, clear, and exact description of the invention, such as will enable others skilled in the art to which it appertains to make and use the same.

This invention relates to motor vehicles, and more particularly to motor trucks, and the primary object of the invention is to provide means for driving the fore or front wheels of the vehicle without impeding the steering proclivities of the same.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a plan view of the improved mechanism for driving the fore or front wheels of the vehicle, Fig. 2 is a fragmentary side elevation, showing parts removed, and Fig. 3 is a detail perspective view of a part of the construction used for steering the fore or front wheels.

Referring more particularly to the drawings, 1 and 2 designate the front wheels of a motor vehicle, which are mounted upon stub axles 3 and 4 respectively. The stub axles 3 and 4 have housings 5 mounted thereabout, which housings have a pair of outwardly extending spaced arms 6 and 7 formed upon their inner ends, and extending inwardly toward the center of the chassis of the vehicle.

The stub axles 3 have beveled gears 8 mounted upon their inner ends, and positioned intermediate of the arms 6 and 7. The beveled gears 8 mesh with beveled gears 9, which are mounted upon shafts 10. The shafts 10 extend through the arms 6 and 7, and through arms 11 and 12, which are formed upon the ends of the casing 13, which encompasses a main axle 14. The shafts 10 pivotally connect the arms 11 and 12, to the arms 6 and 7, so as to permit of pivotal movement of the axles 3 and their housings 5 independent of movement of the housing or casing 13 and the axle 14. The axle 14 has beveled gears 15 mounted upon its ends, which mesh with the beveled gears 9, thereby operatively connecting the stub axles 3 and 4 to the main drive axle 14, through the medium of the sprockets 9.

The main axle 14 has a differential gear 15′ mounted thereon intermediate of its ends, which meshes with a differential pinion 16. The differential pinion 16 is mounted upon the motor or power shaft 17, which may be operatively connected to the prime mover or motor of the motor vehicle, for rotating the axle 14 by the action of the prime mover or motor.

The housings 5, which inclose the stub axles 3 and 4, have members 18 connected thereto. The members 18 are composed of rods 19, which form the body of the members, and a plurality of legs 20, which converge at their point of conjunction with the body 19, and diverge as they extend outwardly therefrom. The ends of the legs 20 are screw threaded, as is shown at 21, and they are detachably connected to the wings 22 of the housings 5. The legs 20 extend transversely from the body 19. A head end 23 is formed upon the end of the body 19 remote from the outermost leg 20, and it is bent upwardly at substantially right angles to the body 19 and oppositely from the legs 20. A head 24 is formed upon the upper end of the section 23, and a nut 25 is adjustably mounted thereon. The end 23 of the body 19 is provided for connection with the cross rod 27, of the steering mechanism.

The cross rod 27 has an enlarged portion formed therein, as is shown at 28, to which an arm 29 is connected. The arm 29 is in turn connected to a rod 30. The rod 30 has a gear 31 mounted thereon, which meshes with a gear 31′. The gear 31′ meshes with a gear 32 carried by the lower end of the steering post 35. The rod 30 and the steering post 33 are rotatably supported by a suitable bracket 34, which is attached to any part of the chassis of the motor vehicle, convenient to the cross rod 27, as is clearly shown in Fig. 1 of the drawing.

The rotation of the steering post 35 will rotate the gear 32, which will in turn rotate the rod 30, through its meshing engagement with the gear 31. The rotation of the rod 30 will move the arm 29, causing the cross rod 27 to move longitudinally, for moving the stub axles 3, for guiding the wheels 1 and 2 of the machine.

From the foregoing description taken in connection with the accompanying drawings the advantages of construction and of the method of operation of the improved fore wheel drive for motor vehicles will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a device as set forth, the combination, of a main axle, a plurality of pivotally supported stub axles, a housing mounted about said stub axles, a cross rod, means connecting said cross rod and said stub axle inclosing housings including bodies, a plurality of diverging arms formed upon said bodies and extending transversely therefrom, said arms being detachably connected to said housings, a head formed upon said bodies and extending oppositely from said arms for connection to said cross rod, and means for moving said cross rod longitudinally for moving said stub axles upon their pivotal support.

In testimony whereof I affix my signature in presence of two witnesses.

WILLIAM M. GREEN.

Witnesses:
E. B. KERER,
FRED D. BOTHWELL.

Copies of this patent may be obtained for five cents each, by addressing the "Commissioner of Patents, Washington, D. C."